April 25, 1961  F. MARTI ET AL  2,981,054
TIME-PIECE

Filed Jan. 27, 1959  3 Sheets-Sheet 1

INVENTORS
FREDERIC MARTI
GEORGES BRAUNSCHWEIG
BY
Curtis, Morris & Safford
ATTORNEYS

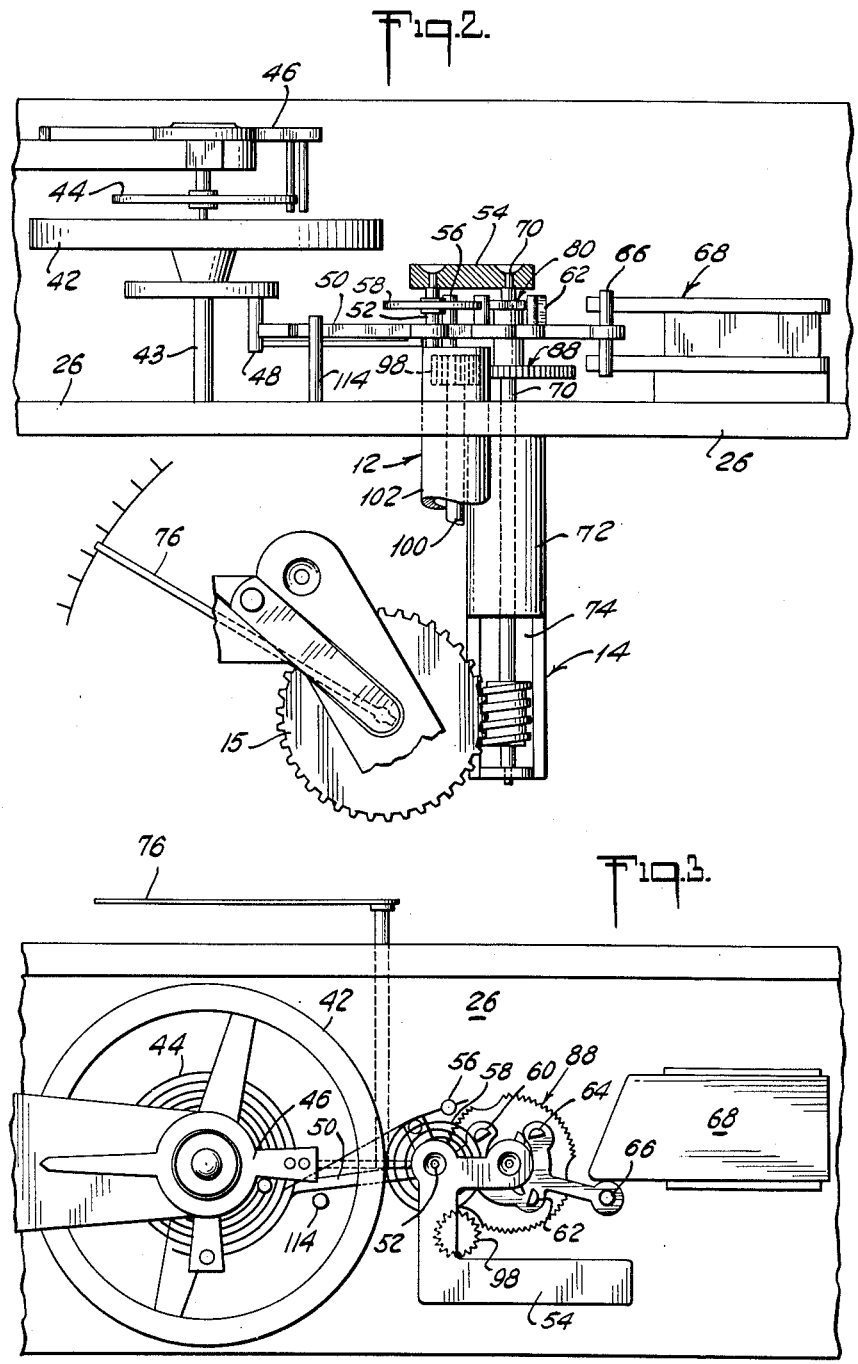

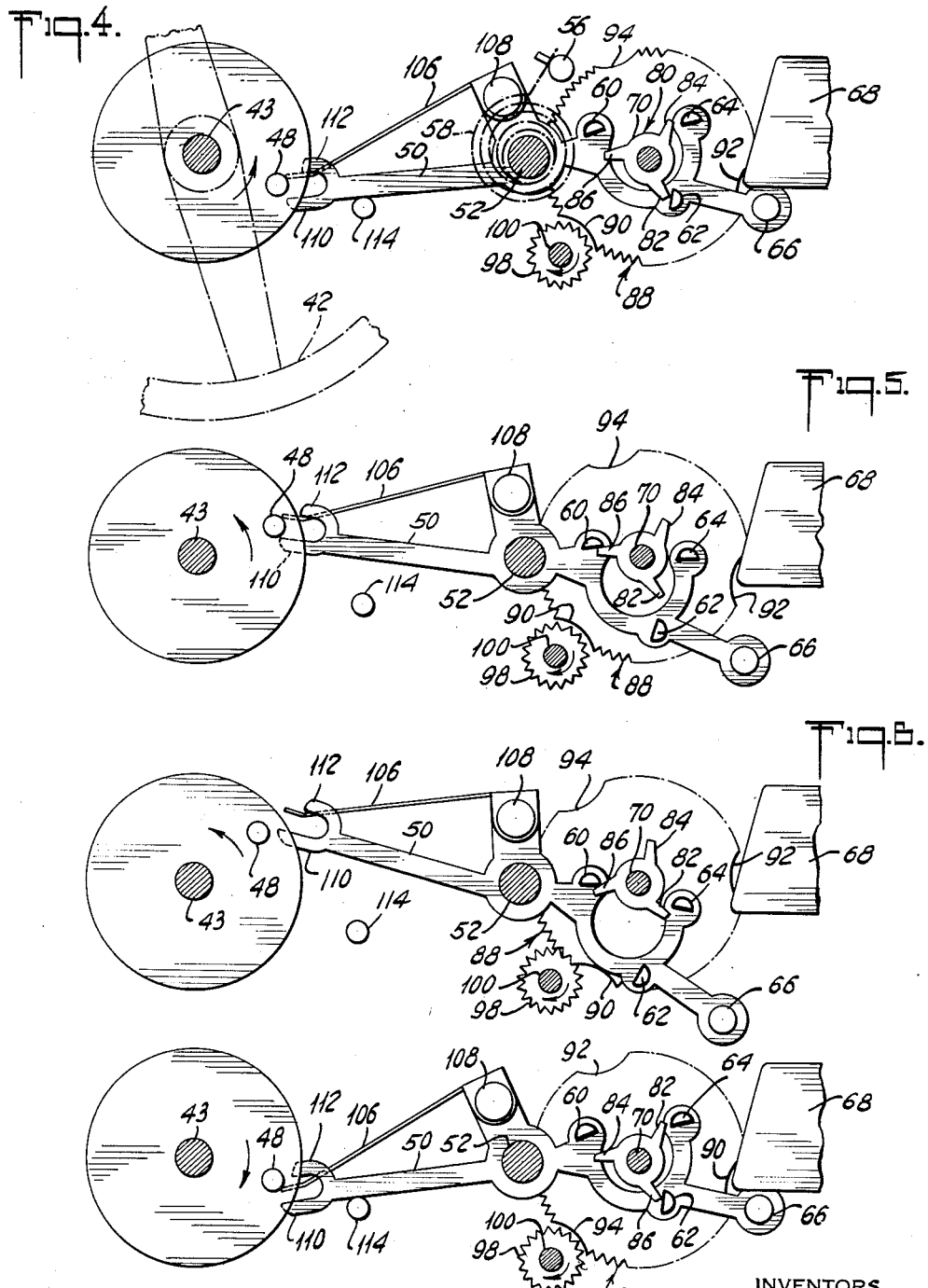

United States Patent Office 2,981,054
Patented Apr. 25, 1961

2,981,054
TIME-PIECE
Frederic Marti and Georges Braunschweig, both of 165 Rue Numa-Droz, La Chaux-de-Fonds, Switzerland
Filed Jan. 27, 1959, Ser. No. 789,391
12 Claims. (Cl. 58—28)

This invention relates to a time-piece having improved accuracy and efficiency, more particularly it relates to a time-piece especially suited for operation from a small electric motor and battery.

An object of this invention is to provide a very accurate time-piece mechanism which can run on a minute amount of power, such as current from a small battery, and which will keep exact time in spite of variation over a wide range in the supply of power to it.

Another object is to provide a highly precise and reliable time-piece which is very easy to service or repair.

Still another object is to provide such a time-piece which is relatively simple and inexpensive.

These and other objects will in part be understood from and in part pointed out in the description given hereinafter.

On previously known kind of battery operated clock has a balance wheel which is periodically energized by an electric solenoid or by a motor advancing step-by-step. Each time the balance wheel completes an oscillation, it closes an electric switch which in turn energizes the solenoid or motor to impart a unit of force to the balance wheel. When the force has been imparted, the switch is opened and this quickly de-energizes the solenoid until the next cycle, and so on.

One problem with a clock mechanism of this kind is that the contacts of the switch may become dirty or worn or fail to close for some reason thereby causing the clock to run inaccurately or to stop. Additionally, the mechanical impulse or energizing force applied to the balance wheel each time by the electric solenoid has in the past been dependent upon the electrical strength of the battery energizing it. As the battery is used up and approaches exhaustion its strength decreases and the clock will run slower and slower. A solution to this latter difficulty is provided by applicants' invention disclosed and claimed in co-pending application U.S. Serial No. 599,724, filed July 24, 1956.

In accordance with the present invention, there is provided a further improved time-piece mechanism having a precisely regulated, uniformly driven balance wheel which is adapted to be kept in oscillation by a highly efficient, continuously running miniature electric motor. This motor requires very little power and can run with great reliability for a year or more on a single small flashlight battery. So long as the motor and battery have enough strength to keep the balance wheel oscillating, even though the speed of the motor greatly decreases as the battery nears exhaustion the accuracy of this time-piece will remain effectively constant. To accomplish this, the motor while it is rotating is periodically coupled through a unique mechanical clutch for a short instant controlled by the balance wheel to a constant-force pallet lever arrangement. The latter in turn upon each oscillation of the balance wheel drives it with a constant impulse.

The motor when not connected by the clutch to the lever arrangement is free running. Accordingly, the rotational momentum of the motor keeps its speed during the short drive instants substantially equal to the free running speed, and thus in this mechanism motor inertia is a benefit rather than a hindrance. This in turn means that only a small continuous trickle of power need be applied to the motor to run it, rather than repeated large bursts of power as in prior arrangements.

The amount of energy imparted to the balance wheel by the constant-force lever arrangement, though this energy is derived from the motor, is not dependent on motor speed. Rather the amount of energy is determined by a constant-force hairspring opposed in part by the light, frictionless pull of a permanent magnet against one end of the lever. The motor merely re-cocks the pallet lever for each new stroke, this continuing regularly for as long as the motor has sufficient drive strength or speed to re-cock the pallet lever. When the battery has run down so much and the motor runs so slowly that it is no longer able to re-cock the pallet lever, then the mechanism will abruptly stop—there is no gradual slowing down.

The gear train leading to the time-indicating hands in this mechanism is driven by the motor through the clutch a unit step each time the pallet or drive lever is re-cocked, the gear train is not driven during an impulse stroke of this lever. Thus, the oscillation of the balance wheel is not affected by the variable drag or friction of the gear train.

The three main units of this time-piece comprising: a, balance wheel, pallet lever, and clutch arrangement; b, gear train assembly and indicator hands; and c, motor, can be quickly and easily disengaged from each other to facilitate servicing of the parts or to permit entire replacement of any unit if need be. Thus, inexperienced repairmen can adequately service this time-piece. Even though possessing these important advantages, the parts of this time-piece are relatively simple and do not require critical manufacturing tolerances or excessive time for assembly. These parts operate smoothly and efficiently so that not only is the time keeping accuracy of the mechanism exceptionally good (for example, only two seconds a day deviation) but it will have a long and trouble free life.

A better understanding of the invention together with a fuller appreciation of its many advantages will best be gained from the following detailed description given in connection with the accompanying drawings wherein:

Figure 3 is a top view of portion a showing also one of the time-indicating hands carried by portion b;

Figure 4 is a greatly enlarged top view of the center part of Figure 3 showing the balance wheel, pallet lever and clutch in their respective positions at the instant prior to the imparting of an impulse of force from the pallet lever to the balance wheel;

Figure 5 is similar to Figure 4 but shows the parts at the end of an impulse stroke;

Figure 6 shows the parts at an instant slightly later than in Figure 5 and at the beginning of the re-cocking of the pallet lever;

Figure 7 shows the parts after the pallet lever has been re-cocked and a short time before the beginning of the next impulse stroke to the balance wheel; and Figure 8 is a circuit diagram of the electric motor.

Figures 1, 2:
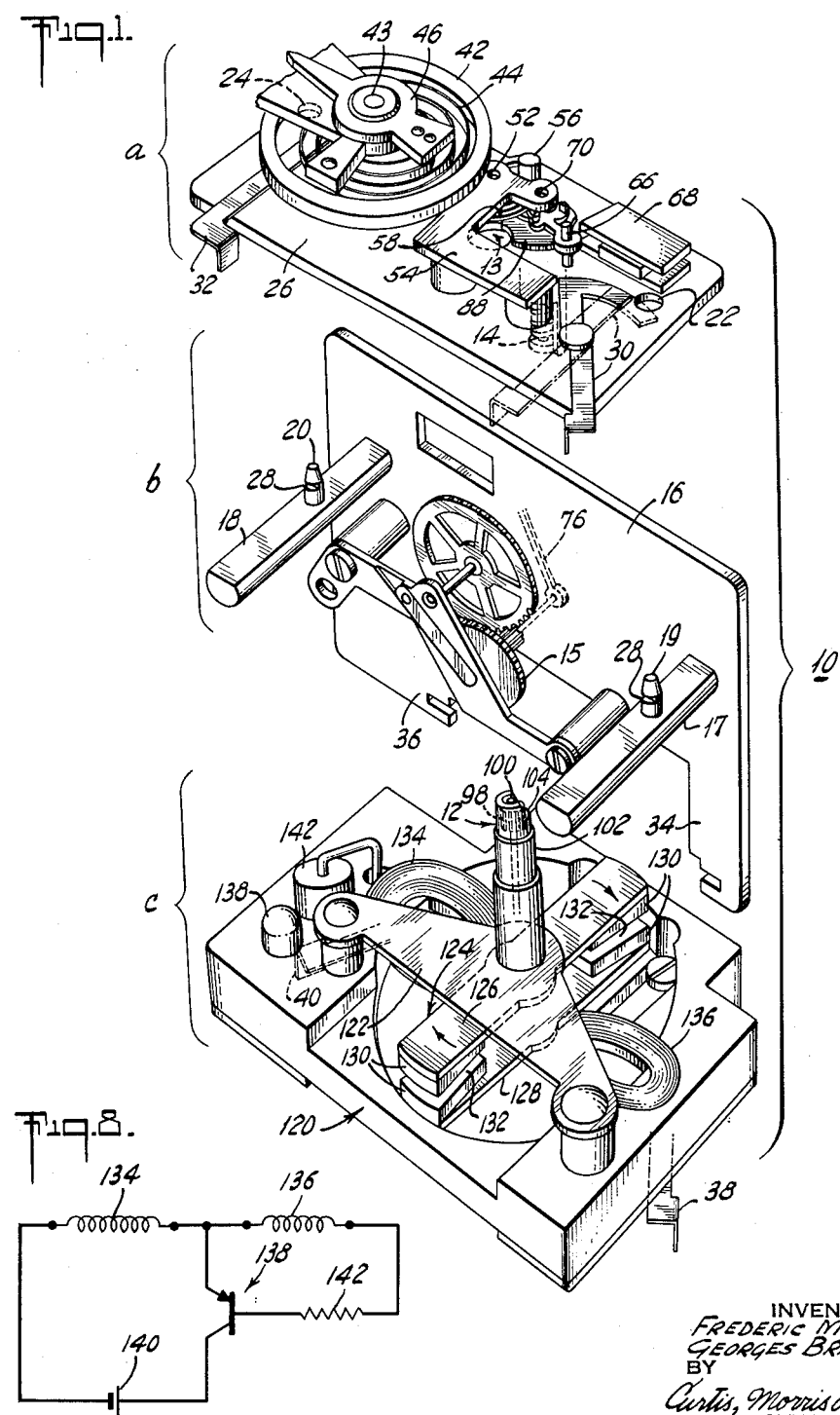
Figure 1 is an exploded perspective view seen from the rear, of a time-piece mechanism embodying features of the invention, the mechanism being shown separated into three main portions comprising: a, a balance wheel, pallet lever and clutch arrangement; b, a gear train assembly; and c, a motor, certain parts being broken away or omitted and no housing being shown.
Figure 2 is an enlarged rear view of portion a of the mechanism, fragments of portion b and c being shown to indicate how they fit together.

The time-piece mechanism 10 shown in exploded relation in Figure 1 includes three main units, namely: portion *a* carrying a balance wheel, pallet lever and clutch; portion *b* comprising a gear train and indicator hands; and portion *c* comprising a motor. These three units fit vertically together and engage one another as indicated by the dotted axial lines, motor portion *c* having an upward extending drive shaft 12 which engages portion *a* through a hole 13, and portion *a* having a downward extending worm shaft 14 which engages a gear 15 of portion *b* (see also Figure 2). Portion *b* has a vertical frame 16, extending from the rear side of which are two rigid and parallel posts 17 and 18. Each of these in turn carries along its length two short vertical studs 19 and 20 which are adapted to engage corresponding holes 22 and 24 in the base plate or frame 26 of portion *a*. Each stud has a narrow cutout or groove 28 in its rear face. To lock these studs in engagement with their respective holes in plate 26, the latter has pivoted to it two thin arms 30 and 32. The forward ends of these arms are adapted to swing across and partway over holes 22 and 24, each end thereby engaging a corresponding groove 28 in studs 19 and 20. In similar manner the lower end of frame 16 has two slotted tabs 34 and 36 which engage in a mortice joint (not shown) in the front of motor portion *c*. A pair of locking arms 38 and 40 are pivoted on the underside of the motor, the forward ends of these arms being engageable with the slots in tabs 34 and 36 in a manner similar to arms 30 and 32 with studs 19 and 20.

As seen in Figures 1 and 2, portion *a* of this time-piece mechanism includes a balance wheel 42 which is pivotally mounted upon base 26 by a vertical axle or balance staff 43. Connected between the balance wheel axle and a fixed part of the base is a conventional hairspring 44 which is engaged by a timing-adjustment arm 46, also of known construction. Projecting downward beneath the balance wheel and parallel to axle 43 is a pallet pin 48, which (see also Figures 4-7) engages the left end of a pallet fork or drive lever 50. As the balance wheel oscillates back and forth, pin 48 periodically contacts the pallet lever and receives an impulse from it. The amount of energy in each impulse, as will be explained in detail shortly, is uniform and equal to that in every other impulse.

As seen best in Figures 2, 3, and 4, lever 50 is pivoted nears its midpoint to frame 26 on a vertical axle or fork staff 52, the upper end of the axle being journalled in a bracket 54 fixed to the frame. Attached between axle 52 and a short post 56 extending upward from frame 26 is a constant-force hairspring 58 which, as viewed in Figure 4, tends to rotate lever 50 clockwise about is axle.

To the right of axle 52, lever 50 is sickle shaped as shown, carrying three short, upright, flattened pins or detents 60, 62, and 64, the right-most end of the lever carrying a short vertical pin or bar 66 of magnetic material. This last, as will shortly be explained more fully, co-operates with a stationary permanent magnet 68 mounted on frame 26. The flattened faces of pins 60 and 64 lie generally along radii from axle 52, the flattened face of pin 62 lies generally perpendicular to such a radius.

Detent pins 60, 62, and 64 are arranged in crescent-like configuration around a vertical axle 70, the upper end of which as seen in Figure 2 is journalled in bracket 54. The lower end of axle 70 comprising worm shaft 14 is rotatably supported by a rigid tube 72 extending downward from frame 26 and having a cut-away portion 74 exposing worm 14. Gear 15 is tangentially engaged by this worm and as seen in Figure 1 is itself rotatably mounted on frame 16 of portion *b*. A "seconds" indicating hand 76 can be directly coupled to the axle on which gear 15 is mounted, it being understood that conventional reduction gears for the "minutes" and "hours" hands (not shown) are to be mounted on portion *b* and driven from gear 15 in the usual way.

As seen in Figures 2 and 4, axle 70 has fixed to it near its upper end a tri-shaped clutch or cam 80 having three prongs 82, 84 and 86 which in the way to be explained co-operate with detent pins 60, 62 and 64 of lever 50. Also fixed to axle 70 just above frame plate 26 is a gear wheel 88 which has around its rim three symmetrically located cutout portions 90, 92, and 94. The toothed portions of gear wheel 88 are adapted to engage the teeth of a spur gear 98 which is mounted on an axle 100. This axle, as seen in Figures 1 and 2, comprises drive shaft 12 from motor portion *c*, the upper end of the axle being rotatably supported by a rigid tube 102 cut away at 104 to expose gear 98.

When time-piece 10 is running, at a certain instant of time the balance wheel, drive lever and clutch will occupy positions as shown in Figure 4. At this instant, balance wheel 42 will be rotating counterclockwise with a relative velocity indicated by the short arrow to the left of pallet pin 48. This pin has just come into contact with the left end of a leaf spring 106 whose right end is fastened to a part 108 projecting from and integral with drive lever 50. The left end of this spring as seen in Figure 7 is free to move inward or toward the longer tip 110 of lever 50 but will in the reverse direction as seen in Figure 4 abut the inside of a shorter tip 112 and move lever 50 clockwise.

In the position of Figure 4, lever 50 is being urged clockwise by hairspring 58 but the pull of magnet 68 on pin 66 overcomes this spring force and is holding the left end of the lever against a vertical post 114. This post extends upward from frame 26, and is located so that pin 66 is separated a small but finite distance from magnet 68. Now, as pallet pin 48 continues to advance, it catches the left end of lever 50 and swings it clockwise about axle 52. The initial movement of pin 66 away from magnet 68 quickly decreases the attraction between them. This immediately frees the lever to swing farther clockwise and its tip 110 then imparts to pin 48 and the balance wheel the energy stored in hairspring 58. The attraction between magnet 68 and pin 66 constitutes a frictionless latch which is easily closed and which opens with the same force each time.

As the balance wheel and lever swing from the position of Figure 4 to that of Figure 5, there are effectively no external forces acting on them except those of their respective hairsprings, and the uniform and very small rotational friction of their axles. Consequently, the timing accuracy of these parts is virtually perfect.

After reaching the position of Figure 5, the balance wheel and pallet pin 48 continue to swing freely counterclockwise as indicated by the arrow. About the time pallet pin 48 and lever 50 disengage, detent pin 60 of lever 50 engages prong 86 of cam 80, detent 62 having shortly before unblocked prong 82 thereby freeing cam 80 for rotation. Thereafter as the lever swings farther clockwise to the position of Figure 6, cam 80 is rotated counterclockwise by pin 60 an amount sufficient for a toothed segment of gear 88 to mesh with spur gear 98. This last, it will be remembered, is continuously rotating and as soon as it engages gear 88 quickly rotates it counter-clockwise until cutout portion 94 is reached, whereupon they once more disengage. In this process, gear 88 rotates axle 70 and hence advances worm shaft 14 a unit amount to drive the gear assembly of portion *b*. Axle 70 also rotates cam 80 so that its prong 82 catches detent 64 to swing lever 50 counter-clockwise and re-cock it. The advance of gear 88 and the re-cocking of lever 50 take place in a time determined by the rotational speed of spur gear 98 and the motor. Normally, this time is very short and the re-cocking is accomplished well before the balance wheel on its return swing reaches the position of Figure 7. However, when the speed of the motor drops below a critical value, the mechanism will abruptly stop.

Just before reaching the position of Figure 7, prong 82 of cam 80 will swing free of detent 64, and prong 86 will become blocked by detent 62, thereby arresting gear 88 so that cutout portion 94 stands opposite spur gear 98. The two gears will remain disengaged and the motor will be free running until the end of the next impulse stroke. As the balance wheel rotates clockwise from the position of Figure 7, pallet pin 48 will freely pass the end of lever 50 because of the one-way action of leaf spring 106. When the balance wheel on the next counter-clockwise swing again reaches the position shown in Figure 4, the above described operation will be repeated.

It will be appreciated by those skilled in the art that the mechanism described thus far can be driven by any continuously running motor having suitable size and speed. A particularly suitable motor, however, is shown in Figure 1. This comprises a frame 120 on which is mounted a bracket 122, extending upward from which is tube 102. Coaxially mounted within this tube is axle 100, the lower end of the axle extending beneath tube 102 to a bearing (not shown). Mounted on axle 100 beneath bracket 122 is a rotor 124 comprising two parallel arms 126 and 128 the outer ends of which carry small permanent magnets 130, each pair being separated by a horizontal gap 132. Positioned in the plane of gaps 132 so that when rotor 124 revolves magnets 130 pass closely above and below, are two flat oval coils 134 and 136. Current surging through these coils drives the rotor.

The electrical circuit for the motor just described is shown in Figure 8. Coil 134 is connected in a direct current loop with the emitter and collector electrodes of a transistor 138 and a battery 140, which may for example be a 1.5 volt flashlight battery. Coil 136 is connected in series with the emitter and base electrodes of the transistor and a regulating resistor 142. As magnets 130 rotate past coil 136, they induce in it an alternating current. This in turn causes a surging, uni-directional current to flow in coil 134, the magnetic field induced by this current driving rotor 124. No mechanical contacts or switches are required in this arrangement. The average current drawn from battery 140 in operating time-piece 10 is minute. In an actual mechanism which has been built and successfully operated, this current for a battery voltage of about 1.5 volts was less than one-one thousandth of an ampere.

Figures 1–7 of the drawings herein were made from an actual mechanism and show the relative size and positions of its parts and elements substantially to scale.

We claim:

1. An improved time-piece having great accuracy and efficiency, comprising: a mechanically oscillatable member, a pivoted impulse lever, spring means biasing said lever in one direction, magnetic latch means for holding said lever in cocked condition against the action of said spring means, said oscillatable member being adapted periodically to contact said lever and un-latch it to receive an impulse of energy stored in said spring means, a gear train adapted to drive time-indicating hands, a continuously rotating motor, and clutch means for periodically during a short instant coupling said motor to said gear train and for re-cocking said lever, said clutch means being timed in operation by said oscillatable member, whereby the accuracy of said time-piece is independent of the speed of said motor over a wide range.

2. A highly accurate time-piece which can operate for a great length of time from a small battery or the like, said time-piece including an oscillatable balance wheel having a pallet pin, a pivoted drive lever having one end engageable by said pallet pin, a hairspring biasing said lever in one direction, frictionless latch means for holding said lever in cocked condition against the action of said hairspring, said pallet pin on each oscillation of said balance wheel contacting said end of said lever to unlatch it and to receive from it an impulse of force, a gear train, a small electric motor adapted to run continuously with very small power consumption, and a mechanical clutch controlled by the position of said lever for giving from said motor to said gear train a unit drive step and thereafter for leaving said motor free running and said gear train stopped until the next cycle, and so on, said clutch acting at the end of an impulse stroke of said lever and simultaneously re-cocking said lever for the next impulse to said balance wheel.

3. The time-piece as in claim 2 wherein said lever is pivoted near its mid-point for swinging back and forth, said one end of said lever being forked and having a fixed prong and a one-way spring prong, the other end of said lever being generally sickle-shaped and having near its pivot three detent pins arranged in roughly crescent shape around said clutch, the very end of said lever carrying a magnetic pin adapted to co-operate with a fixed magnet to latch said lever cocked against the action of said hairspring, said clutch comprising an axle positioned within said crescent part of said lever, a circular gear carried by said axle and having a toothed rim with three evenly spaced cutout portions therearound, a spur gear mounted on a motor shaft driven by said motor and positioned adjacent the rim of said circular gear to engage its toothed portions, a cam carried by said axle and having three radial prongs adapted to cooperate with said detent pins, one of said detent pins at the end of an impulse stroke of said lever serving to rotate said cam to bring said circular gear into engagement with said spur gear, another of said prongs thereupon rotating against another of said detent pins to re-cock said lever, whereupon the remaining one of said detent pins blocks the third one of said prongs in position so that a cutout portion of said circular gear stands opposite said spur gear, said gears remaining disengaged until the end of the next impulse stroke of said lever, and so on.

4. The time-piece as in claim 3 wherein said axle has a worm shaft extension parallel to said motor shaft and engaging said gear train, said balance wheel, lever and axle being mounted on a first frame, said gear train being mounted on a second frame, and said motor, motor shaft and spur gear being mounted on a third frame, said frames fitting axially together and locking into engagement with said second frame between and separating said first and third frames, whereby said time-piece can quickly and easily be disassembled for service or repair.

5. A highly accurate and efficient time-piece mechanism including an oscillatable timing member having a regulated speed, a lever periodically engageable by said member to impart to said member a driving impulse of force, drive means, and a gear train adapted to move time-indicating hands and the like, said mechanism characterized in that said drive means is a continuously rotating motor shaft, there being a mechanical clutch interposed between said shaft and said gear train, said clutch being put into engagement by the motion of said lever and thereafter automatically disengageable after a unit amount of motion, said clutch also imparting movement to said lever upon each engagement.

6. The mechanism as in claim 5 wherein the impulse of force imparted by said lever to said member is obtained from a hairspring acting on said lever which is held cocked prior to each impulse, said clutch serving to re-cock said lever against the pull of said hairspring prior to the next impulse.

7. The mechanism as in claim 5 wherein said clutch has an axle on which is mounted an element engaging said gear train, said clutch being mounted on a first frame, said gear train being mounted on a second frame and said motor shaft being mounted on a third frame, said frames being releasably locked together.

8. A highly accurate time-piece mechanism having improved efficiency, said mechanism including an oscillatable timing member, impulse means actuated by said member and adapted periodically to impart uniform driving impulses thereto, drive means adapted to rotate continuously, a gear train for driving indicating hands and the like at an accurate rate, and clutch means interposed between said drive means and said gear train, said clutch means being periodically actuated in response to the motion of said oscillatable member to provide increments of driving energy for said impulse means and said gear train, whereby the accuracy of said mechanism is effectively independent of the speed of said drive means over a wide range.

9. A time-piece mechanism having improved accuracy and efficiency, said mechanism comprising an oscillatable timing member adapted to move back and forth at a regulated rate, a gear assembly to be driven at a rate determined by said timing member, a drive element adapted to rotate continuously, and clutch-impulse means interposed between said drive element and said gear assembly and said timing member, said clutch-impulse means being periodically actuated in response to the motion of said timing member to supply increments of driving energy to said gear assembly and to said timing member whereby the accuracy of said mechanism is effectively independent of the speed of said drive element over a wide range.

10. In timing mechanism of the character described, a balance wheel, a mechanical clutch-impulse unit, a gear assembly adapted to drive indicating hands and the like at an accurately controlled rate, and a drive motor assembly having a shaft adapted to be continuously rotated, said shaft being periodically coupled for momentary intervals to said gear assembly through said clutch-impulse unit, said clutch-impulse unit being actuated periodically by said balance wheel to couple said shaft to said gear assembly and to impart uniform drive impulses to said balance wheel.

11. The mechanism in claim 10 wherein said gear assembly is mounted on a first frame, said balance wheel and clutch-impulse unit are mounted on a second frame, and said drive motor assembly is mounted on a third frame, said second and third frames being orthogonally joined to the first, said motor shaft releasably engaging said clutch-impulse unit, and said clutch-impulse unit releasably engaging said gear assembly whereby said frames can easily be separated from each other.

12. In timing mechanism of the character described a first frame portion including a balance wheel and a clutch-impulse unit having a segmented gear mounted on a projecting shaft, the projecting end of which carries a first gear, a gear train assembly mounted on a second frame portion, said gear train assembly including a second gear the rim of which is engaged with said first gear, and a motor having a drive shaft the outer end of which carries a plain wheel gear positioned next to said segmented gear, said segmented gear being normally out of engagement with said plain wheel gear and being advanced into engagement therewith periodically by movement of said balance wheel, whereby said frame portions and motor can easily be separated from each other and the accuracy of said mechanism is effectively independent of the speed of said motor over a wide range.

References Cited in the file of this patent
UNITED STATES PATENTS

| | | |
|---|---|---|
| 372,780 | Zelly | Nov. 8, 1887 |
| 1,874,967 | Greenleaf | Aug. 30, 1932 |
| 2,700,272 | Trichel | Jan. 25, 1955 |